(12) United States Patent
Laloy et al.

(10) Patent No.: US 8,610,330 B2
(45) Date of Patent: Dec. 17, 2013

(54) ROTOR FOR A MULTIPOLAR SYNCHRONOUS ELECTRIC MACHINE WITH SALIENT POLES

(75) Inventors: Daniel Laloy, Jeumont (FR); Guy Legoix, Maubeuge (FR); Brahlm Ammar, Louvres (FR)

(73) Assignee: Jeumont Electric, Jeumont (FR)

( * ) Notice: Subject to any disclaimer, the term of this patent is extended or adjusted under 35 U.S.C. 154(b) by 0 days.

(21) Appl. No.: 12/993,443

(22) PCT Filed: May 15, 2009

(86) PCT No.: PCT/FR2009/050917
§ 371 (c)(1),
(2), (4) Date: Dec. 21, 2010

(87) PCT Pub. No.: WO2009/150357
PCT Pub. Date: Dec. 17, 2009

(65) Prior Publication Data
US 2011/0095643 A1    Apr. 28, 2011

(30) Foreign Application Priority Data
May 19, 2008    (FR) ...................................... 08 53243

(51) Int. Cl.
*H02K 1/06*    (2006.01)
(52) U.S. Cl.
USPC ....... 310/216.098; 310/216.091; 310/216.094
(58) Field of Classification Search
USPC .................. 310/216.132, 269, 216.098, 102, 310/216.088, 216.89, 216.091, 216.094
See application file for complete search history.

(56) References Cited

U.S. PATENT DOCUMENTS 3,728,566 A * 4/1973 Costello ........................ 310/194
3,846,651 A   11/1974 Mishra

FOREIGN PATENT DOCUMENTS

| GB | 204 433 A | 10/1923 |
| GB | 730 948 A | 6/1955 |
| GB | 2425662 A * | 11/2006 |

OTHER PUBLICATIONS

Machine Translation GB2425662 (2006).*
International Search Report as issued for PCT/FR2009/050917, dated Jan. 29, 2010.

* cited by examiner

*Primary Examiner* — Tran Nguyen
*Assistant Examiner* — Jose Gonzalez Quinones
(74) *Attorney, Agent, or Firm* — Pillsbury Winthrop Shaw Pittman LLP

(57) ABSTRACT

A rotor for a multipolar synchronous electric machine including a plurality of salient poles, each salient pole being surrounded by an induction coil; a ring integrating the plurality of salient poles; wherein each salient pole includes a polar body integral with the ring; two removable pole tips facing each other on either side of the polar body; front parts provided along the ends of the polar body, to radially maintain the induction coil in a transverse portion thereof; the polar body including two slots formed on either side of the polar body and having a shape adapted for receiving the pole tips; the front parts blocking the displacements of the pole tips in the slots.

7 Claims, 1 Drawing Sheet

ROTOR FOR A MULTIPOLAR SYNCHRONOUS ELECTRIC MACHINE WITH SALIENT POLES

CROSS-REFERENCE TO RELATED APPLICATIONS

This is the U.S. National Stage of PCT/FR2009/050917, filed May 15, 2009, which in turn claims priority to French patent application Ser. No. 08/53243, filed May 19, 2008, the entire contents of all applications are incorporated herein by reference in their entireties.

The present invention relates to the field of rotating synchronous electric machines comprising a stator assembly and a rotor assembly, the rotor assembly pivoting with relation to the stator assembly around an axis of rotation.

More particularly, the present invention relates to a rotor for a multipolar synchronous electric machine with salient poles.

In general, rotors with salient poles have field poles situated at the periphery of a magnetic circuit ring.

These rotors are generally utilized in low speed applications up to 1000 rpm in laminated poles and 1500 rpm in solid poles.

In a known manner, the rotor for a synchronous electric machine with salient poles comprises:
  a central part formed by the magnetic circuit ring and a central shaft; for small-diameter rotors, the central shaft and the magnetic circuit ring only form a single part;
  salient poles or poles formed by a central part called either a pole body or polar body and a peripheral part called a pole shoe; constant induction flows through each pole in its central part; on the other hand, at the surface of the pole at a pole shoe, induction is pulsed as a result of rotation before the slots of the stator;
  Induction coils surrounding each polar body formed by a stack of coil turns.

Synchronous machines are electric machines in which the rotation speed of the output shaft is equal to the rotation speed of the magnetic field. Magnetization of rotating machines with salient poles is obtained by the inductor formed by the induction coil surrounding the polar body.

Induction coils are disposed around polar bodies in several ways.

According to a first known embodiment of a multipolar rotor with salient poles, each pole comprising a polar body and a pole shoe is added to a rim or to a shaft by means of plugs, dovetails or screws. In this embodiment, the coil is mounted on the polar body before the body is mounted on the rim or shaft. Whatever the hanging system utilized for mounting the polar body on the rim or shaft, the hook is very stressed when the rotor is rotated.

In fact, as the polar bodies, induction coils and pole shoes are far from the center of rotation, they are subjected to centrifugal force during rotation of the rotor, the centrifugal force being all the stronger as the rotor diameter is larger and the rotor rotation speed is faster (the centrifugal force undergone by solids in rotation is proportional to their distance and to their mass). Thus, the hanging system must bear the stresses produced by the rotation of the rotor of the added assemblies, i.e. the solid parts such as the polar body, polar shoe and induction coil wound around the polar body. Thus, the system of hanging screw-type polar bodies is only suitable for low rotation speeds. The system of hanging plug- or dovetail-type polar bodies is suitable for higher rotor rotation speeds requiring, on the other hand, very precise and costly machining of the parts, as well as strict mechanical quality standards for the materials.

In addition, it should be noted that according to this first embodiment, placement of the polar body/coil/pole shoe assemblies on the rim requires very delicate and complex handing due to the significant masses of the parts to displace and adjust.

In order to prevent significant stressing of the hooks connecting the polar body to the rim of a synchronous rotor, a second known embodiment of a synchronous rotor with salient poles consists of utilizing a polar body forming an integral part of the rim or shaft. Only the solid pole shoe is added and fixed to the polar body by means of several screws. The induction coil is placed around the polar body before assembly of the pole shoe. Positioning the pole shoe requires, first, delicate handling since it is a heavy part and, second, suitable tools. In addition, the fixation method of the pole shoe by means of screws on the polar body necessarily requires the utilization of a sturdier solid polar body than the utilization of a laminated polar body formed of a succession of electrical sheets of several millimeters thickness.

Whatever the embodiment taken to date, the placement of heavy elements presenting high masses that are difficult to handle, such as coiled polar bodies or even pole shoes added to the polar bodies, is a long and costly operation requiring the use of special tools.

In this context, the invention aims to provide a rotor for a multipolar synchronous electric machine with salient poles, whose assembly is simple and fast while ensuring precise positioning of each coil around each corresponding polar body.

For this purpose, the invention proposes a rotor for a multipolar synchronous rotating machine comprising:
  a plurality of salient poles, each salient pole being surrounded by an induction coil;
  a ring integrating said plurality of salient poles;
said rotor being characterized in that each salient pole of said plurality of salient poles comprises:
  a polar body integral with said ring;
  at least two removable pole tips facing each other on either side of the polar body;
  front parts provided along the ends of said polar body, to radially maintain said induction coil in its transverse portion;
said polar body comprising two slots formed on either side of the polar body and having a shape adapted for receiving said at least two pole tips;
Said front parts blocking the displacements of said at least two pole tips in said slots.

Thanks to the invention, it is possible to easily mount pole tips on polar bodies forming an integral part of the rotor, without the use of special tools. This device does not require the handling of heavy parts such as shoes or even polar bodies. In fact, the polar bodies form an integral part of the rotor ring, and only the pole tips corresponding to the ends of the pole shoe are added to the polar body. Thus, this avoids having a plurality of hanging systems for heavy parts that are very stressed when the rotor is rotated via centrifugal force.

The rotor for a multipolar synchronous electric machine with salient poles according to the invention may also present one or more of the characteristics below, considered individually or according to all technically possible combinations:
  each salient pole of said plurality of salient poles comprises a first series and a second series, each comprising a plurality of pole tips provided along said polar body, each pole tip of said first series facing a pole tip of said second series;

said slots are made continuously along said polar body;

each pole tip comprises a retaining lug pushed into said slot, the shape of said retaining lug being adapted for radially maintaining said induction coil;

said pole tips radially maintain said induction coil in its longitudinal part;

each of said pole tips comprises at least one discharge line suitable for cooling said induction coil;

Said polar body is a laminated part formed by a succession of electrical sheets.

Other characteristics and advantages of the invention will more clearly emerge from the description given below, for indicative and in no way limiting purposes, with reference to the attached figures, among which:

FIG. 1 represents a cross sectional view by a plane perpendicular to the axis of rotation of the rotor, a rotor 100 with salient poles for a synchronous electric machine.

Figure 1:
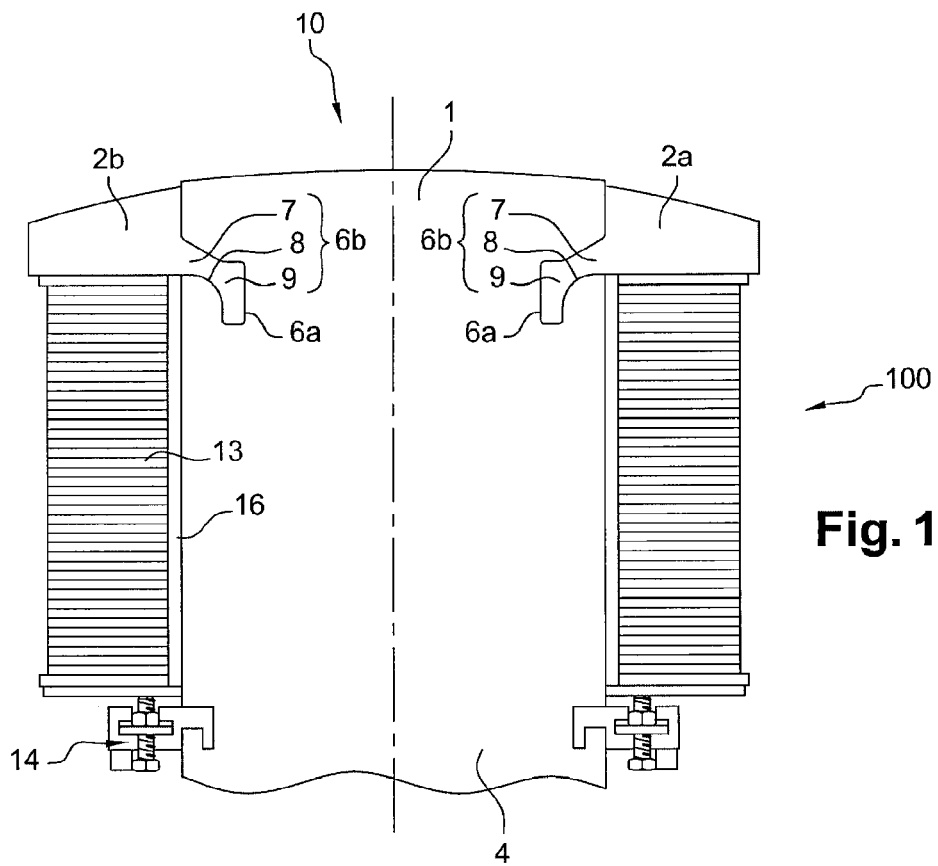
FIG. 1 is a cross sectional view by a plane perpendicular to the axis of rotation of the rotor, a rotor with salient poles for a synchronous electric machine.

More particularly, FIG. 1 represents a salient pole 10 from among a plurality of salient poles of rotor 100.

Each salient pole 10 comprises a pole body or polar body 1 surrounded by an induction coil 13. Polar body 1 is preferentially a laminated polar body formed by a stack of steel electrical sheets. Polar body 1 is an integral part of rim 4 constituting the magnet wheel of the magnetic circuit of the synchronous electric machine. Preferentially, rim 4 is a laminated part constituted of a stack of electrical sheets hot-mounted onto a shaft or a hub (not represented).

The induction coil 13 is made with a copper conductor of circular or rectangular section surrounding the polar body with a certain number of coil turns. The induction coil 13 is wound on mandrels and separately agglomerated before being mounted on the polar body. The induction coil 13 may comprise offset coil turns with one coil turn alternating with three or four coil turns so as to form cooling fins that enable the cooling effectiveness to be improved.

The induction coil 13 may also be wound so as to have an inner perimeter of the induction coil 13 greater than the outer perimeter of the polar body 1 so as to create a passage 16 for the circulation of a coolant and thus facilitate cooling of the inner surface of the induction coil 13.

Insulation of the induction coil 13 turns is achieved by insulating strips pre-impregnated with a thermosetting resin. The coil is then pressed and undergoes a heat treatment which enables a compact assembly with excellent thermal conductivity to be obtained.

According to another embodiment of the invention, the induction coil 13 is made with fiberglass-covered wires. The insulated wire is then wound over several layers. Varnish or resin is interposed between each wire layer to provide a final rigidity to the induction coil 3 after polymerization.

It is also possible, according to another embodiment of the invention, to make the induction coil 13 with thermoadherent enameled copper wires. The thermoadherent wires are enameled copper wires covered with an outer heat bondable layer enabling bonding of the coil turns assembled by polymerization of this outer layer under the effect of the temperature; therefore the application of a varnish or resin when the induction coil 13 is made is unnecessary.

The tangential holding of the induction coil 13 during rotation of the rotor is performed in large part by the resistance of the induction coil 13, said resistance being essentially obtained according to the mechanical quality of the varnish or resin used to agglomerate the coil turns between each other by polymerization. If the tangential stress of the centrifugal force is such that the shear stress between the coil turns exceeds the maximum stress that the varnish or resin may bear, the induction coil 13 tends to deform by swelling in its center. Then one or more corner wedges (not represented), also called interpolar wedges, should be disposed, that enable the shear stress to be brought back to an acceptable value for the parts of the coils between the corner wedges. Generally, the corner wedges are screwed onto rim 4 between each polar body 1 so as to maintain the induction coils 13 pressed against the polar bodies 1.

The radial holding of the induction coil 13 is achieved in its upper part by pole tips 2a and 2b, and in its lower part by a set of compressed springs 14. The radial holding of the induction coil 13 in its lower part may also be achieved by any other equivalent means enabling the induction coil 13 to be pressed against pole tips 2a and 2b.

For example, the radial holding of the induction coil in its lower part may be achieved by means of a support sheet folded into a V shape disposed at an interpole space, i.e., between two salient poles. The support sheet is maintained blocked by means of fixation blocks that are mounted by force, so as to maintain the induction coil 13 pressed against pole tips 2a and 2b with a certain pressure.

Pole tips 2a and 2b are situated, by pairs, on either side of the polar body 1 over its entire length, a single pole tip pair 2a and 2b being represented on each polar body 1 of FIG. 1. The pole tip 2a and 2b pairs maintain induction coil 3 in position on either side of polar body 1. For this purpose, polar body 1 comprises slots 6a corresponding to the shape of hooks 6b of pole tips 2a and 2b; Slots 6a being machined over the entire length of polar body 1, thus forming a conduit. Hooks 6b enable placement by fitting together and then by sliding in slots 6a of pole tips 2a and 2b without any other fixation means. The fitting together is carried out by each end of polar body 1 and the sliding along the longitudinal direction of said polar body 1. Hooks 6b have the shape, for example, of a hook oriented substantially towards the center of the rotor, composed of a first part 7 of substantially triangular section meeting a second part 9 of substantially rectangular section, the two parts 7 and 9 being connected by a bent element 8.

The particular shape of hooks 6b enables radial holding of pole tips 2a and 2b, and enables the stresses caused by the centrifugal force of induction coil 3 when the rotor is rotated to be supported, and particularly the stresses caused by the radial component.

Figure 2:
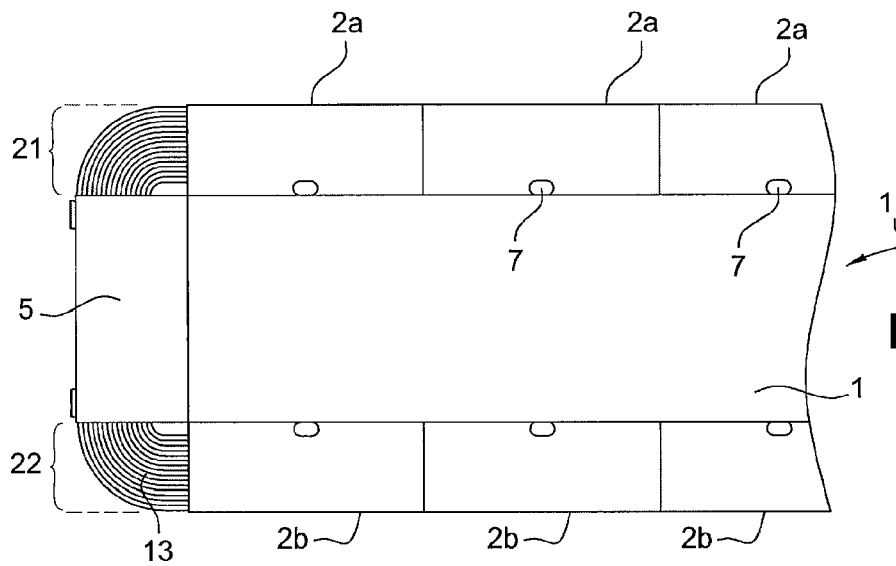
FIG. 2 is a top view of a polar body of a rotor with salient poles such as represented in FIG. 1.

FIG. 2 is a top view of a polar body 1 of a rotor 100 with salient poles 10 of a synchronous electric machine according to the invention represented with reference to FIG. 1.

FIG. 2 particularly illustrates a series of pole tips 2a and 2b positioned on polar body 1 and radially blocking the induction coil 3 of the pole.

Flanges 5, situated at the ends of polar body 1 (only one flange 5 is represented), are maintained integral with rim 4 by means of a screw-type fixation system. Flanges 5 are solid parts in machined, forged or molded steel that enable pole tips 2a and 2b to be maintained in position after their placement on polar body 1. They thus prevent any longitudinal displacement of pole tips 2a and 2b. In fact at the ends of polar body 1, flanges 5 obstruct slots 6a of polar body 1 corresponding to hooks 6b such that the pole tips 2a and 2b can no longer be disassembled or displaced in the longitudinal direction of polar body 1. Flanges 5 also enable the front part of the induction coil 13 to be radially maintained and enable the induction coil 13 assembly to be positioned axially.

The combined utilization of pole tips 2a and 2b, and flanges 5 in replacement of a pole shoe according to the prior art enables two uncovered areas 21 and 22 to be disposed at each end of induction coil 3. These areas 21 and 22 improve the cooling of induction coil 3 by increasing its contact surface with ambient air or any other coolant.

The pole tips 2a and 2b may comprise evacuation ducts 7, also promoting cooling of the induction coil 13 and of the rotor by the circulation of coolant. The evacuation ducts 7 traverse the pole tips 2a and 2b at the contact face between the tips and polar body 1. Thus, the evacuation ducts 7 enable the coolant to flow through and be replaced after having conducted thermal exchanges with the inner surface of induction coil 13.

Mounting of the illustrated rotor with salient poles for a synchronous machine is carried out easily and rapidly with a limited number of tools.

The induction coil 13, made separately, is introduced around the polar body 1 previously insulated from the rotor and is tangentially locked onto polar body 1.

Pole tips 2a and 2b are threaded by sliding on polar body 1 by means of slots 6a.

Flanges 5 are then threaded and fixed on rim 4 or on polar body 1 by means of screws. The pole tips are thus blocked longitudinally.

The induction coil 13 is radially maintained in its outer part by pole tips 2a and 2b, and in its inner part by a set of compressed springs or by any other equivalent means.

The set of springs exerts a certain contact pressure on the induction coil 13 so as to radially maintain the coil when the rotor 100 is stopped or rotated.

All the operations described for the mounting of pole tips 2a and 2b, and flanges 5 on polar body 1, are easily performed without special tools.

Lastly, the assembly clearance, on the order of some millimeters, necessary for the descent of induction coil 13 around polar body 1 is then filled in by insulation sheets, generally laminate sheets, with an adequate thickness for limiting the tangential clearance.

Thus, the object of the invention is to provide a multipolar rotor with salient poles for a synchronous electric machine enabling simple and rapid assembly without special tools.

The clever shape of the pole tips enables both a rapid and easy assembly and enables the induction coil to be maintained when the rotor is stopped and rotated. When it is necessary to clean, repair or replace an induction coil, the disassembly operation is largely facilitated, without resorting to special tools, and is quick.

A multipolar rotor with salient poles for a synchronous electric machine comprising a laminated polar body has essentially been described; However, the invention is also applicable to a multipolar rotor with salient poles for a synchronous electric machine comprising a solid one-piece polar body integrated to a solid rim constituting the magnet wheel of the magnetic circuit.

The invention claimed is:

1. A rotor for a rotating synchronous electrical machine comprising:
   a plurality of salient poles, each salient pole being surrounded by an induction coil;
   a ring integrating said plurality of salient poles;
   wherein each salient pole of said plurality of salient poles comprises:
   a polar body integral with said ring;
   at least two removable pole tips facing each other on either side of the polar body, each of the at least two removable pole tips having a hook-shaped end;
   at least two front parts provided along the ends of a longitudinal direction of said polar body, maintained fixed with the ring, to radially maintain said induction coil in a transverse portion thereof;
   said polar body comprising two slots formed on either side of the polar body and having a shape adapted for receiving only by sliding along the longitudinal direction of said polar body said hook-shaped end of said at least two pole tips;
   said front parts blocking the displacements in the longitudinal direction of the polar body and the disassembly of said at least two pole tips in said slots by obstructions of said two slots.

2. The rotor for a rotating multipolar synchronous electric machine according to claim 1, wherein each salient pole of said plurality of salient poles comprises a first series and a second series, each comprising a plurality of pole tips provided along said polar body, each pole tip of said first series facing a pole tip of said second series.

3. The rotor for a rotating multipolar synchronous machine according to claim 1, wherein said slots are made continuously along said polar body.

4. The rotor for a rotating multipolar synchronous machine according to claim 1, wherein each pole tip comprises a retaining lug fitted into said slot, the shape of said retaining lug being adapted for radially holding said induction coil.

5. The rotor for a rotating multipolar synchronous machine according to claim 1, wherein said pole tips radially maintain said induction coil in a longitudinal part thereof.

6. The rotor for a rotating multipolar synchronous machine according to claim 1, wherein each of said pole tips comprises at least one discharge line suitable for cooling said induction coil.

7. The rotor for a rotating multipolar synchronous machine according to claim 1, wherein said polar body is a laminated part formed by a succession of electrical sheets.

* * * * *